(12) United States Patent
Fabre et al.

(10) Patent No.: US 11,884,115 B2
(45) Date of Patent: Jan. 30, 2024

(54) METHOD FOR PRODUCING A REINFORCEMENT STRUCTURE FOR A TIRE

(71) Applicant: COMPAGNIE GENERALE DES ETABLISSEMENTS MICHELIN, Clermont-Ferrand (FR)

(72) Inventors: Thomas Fabre, Clermont-Ferrand (FR); Frédéric Pialot, Clermont-Ferrand (FR); Bertrand Boisdon, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 43 days.

(21) Appl. No.: 17/524,292

(22) Filed: Nov. 11, 2021

(65) Prior Publication Data
US 2022/0063338 A1     Mar. 3, 2022

Related U.S. Application Data

(62) Division of application No. 15/562,945, filed as application No. PCT/EP2016/056964 on Mar. 30, 2016, now abandoned.

(30) Foreign Application Priority Data

Mar. 30, 2015   (FR) ........................................ 1552667

(51) Int. Cl.
*B29C 43/24* (2006.01)
*B29C 43/28* (2006.01)
(Continued)

(52) U.S. Cl.
CPC ............ *B60C 9/2204* (2013.01); *B29C 43/24* (2013.01); *B29C 43/28* (2013.01); *B29C 53/582* (2013.01);
(Continued)

(58) Field of Classification Search
CPC ....... B29C 43/24; B29C 43/28; B29C 53/582; B29C 53/60; B29C 53/62; B29C 53/82;
(Continued)

(56) References Cited

U.S. PATENT DOCUMENTS 4,470,860 A * 9/1984 Gill ....................... B29C 53/821
                                                                156/425
4,783,230 A * 11/1988 Perkins .................. B29D 30/38
                                                                156/193
(Continued)

FOREIGN PATENT DOCUMENTS

EP           2781369 A1 * 9/2014 ........... B60C 9/0064

*Primary Examiner* — Michael A Tolin
(74) *Attorney, Agent, or Firm* — Dickinson Wright PLLC

(57) ABSTRACT

The reinforcing structure for a tire is in the form of a stratified assembly formed of two layers of reinforcing strips of completely connected cross section, and flattened in shape. According to the method, the strips of each layer are laid side by side in a main direction of laying. The strips of the first layer are spaced apart by a distance that is less than the width of the strips of the second layer and in such a way that the edges of the strips of the first layer overlap the edges of the strips of the second layer. The two layers of strips are separated by a layer of uncoupling rubber.

13 Claims, 3 Drawing Sheets

(51) Int. Cl.
    *B29C 53/58*     (2006.01)
    *B29D 30/30*     (2006.01)
    *B29D 30/38*     (2006.01)
    *B29L 30/00*     (2006.01)
    *B60C 9/04*     (2006.01)
    *B60C 9/14*     (2006.01)
    *B60C 9/22*     (2006.01)
    *B60C 9/02*     (2006.01)
    *B60C 9/00*     (2006.01)
    *B60C 9/20*     (2006.01)
    *B29K 667/00*     (2006.01)
    *B29K 105/08*     (2006.01)
    *B29D 30/06*     (2006.01)
    *B29K 21/00*     (2006.01)
    *B29K 105/20*     (2006.01)

(52) U.S. Cl.
CPC ......... B29D 30/3028 (2013.01); B29D 30/38 (2013.01); B60C 9/0028 (2013.01); B60C 9/0042 (2013.01); B60C 9/0057 (2013.01); B60C 9/0064 (2013.01); B60C 9/023 (2013.01); B60C 9/14 (2013.01); *B29D 2030/0682* (2013.01); *B29D 2030/381* (2013.01); *B29K 2021/003* (2013.01); *B29K 2105/08* (2013.01); *B29K 2105/0881* (2013.01); *B29K 2105/20* (2013.01); *B29K 2667/003* (2013.01); *B29K 2995/0078* (2013.01); *B29L 2030/00* (2013.01); *B29L 2030/004* (2013.01); *B29L 2030/008* (2013.01); *B60C 2009/0416* (2013.01); *B60C 2009/2035* (2013.01)

(58) Field of Classification Search
CPC ...... B29C 69/003; B29D 30/20; B29D 30/30; B29D 30/3007; B29D 30/3028; B29D 30/38; B29D 2030/0682; B29D 2030/381; B29D 2030/383; B29D 2030/385; B29D 2030/386; B29K 2021/003; B29K 2105/08; B29K 2105/0881; B29K 2105/20; B29K 2667/003; B29K 2995/0078; B29L 2030/00; B29L 2030/004; B29L 2030/008; B60C 1/00; B60C 1/0008; B60C 5/12; B60C 5/14; B60C 2005/145; B60C 9/0007; B60C 9/0028; B60C 9/0042; B60C 9/0057; B60C 9/0064; B60C 9/02; B60C 9/023; B60C 9/0238; B60C 9/04; B60C 9/08; B60C 9/14; B60C 9/20; B60C 9/2003; B60C 9/22; B60C 9/2204; B60C 2009/0035; B60C 2009/0071; B60C 2009/0078; B60C 2009/0223; B60C 2009/0246; B60C 2009/0433; B60C 2009/0475; B60C 2009/145; B60C 2009/2035; Y10T 152/10783; Y10T 152/10855

See application file for complete search history.

(56) References Cited

U.S. PATENT DOCUMENTS

| | | | | |
|---|---|---|---|---|
| 5,387,303 | A * | 2/1995 | Azuma | B29C 48/156 156/437 |
| 5,484,005 | A * | 1/1996 | Morehart | B60C 1/0008 152/565 |
| 2002/0134481 | A1* | 9/2002 | Abdallah, Jr. | B29C 48/08 152/526 |
| 2013/0240104 | A1* | 9/2013 | Le Clerc | B32B 27/34 152/450 |

* cited by examiner

METHOD FOR PRODUCING A REINFORCEMENT STRUCTURE FOR A TIRE

CROSS-REFERENCE TO RELATED APPLICATION

This application is a divisional of U.S. patent application Ser. No. 15/562,945, filed on Sep. 29, 2017, and titled "METHOD FOR PRODUCING A REINFORCEMENT STRUCTURE FOR A TIRE", now abandoned, which is the National Stage of International Patent App. No. PCT/EP2016/056964, filed Mar. 30, 2016, and titled "METHOD FOR PRODUCING A REINFORCEMENT STRUCTURE FOR A TIRE", which claims priority to French Patent App. No. FR 1552667, filed Mar. 30, 2015, and titled "METHOD FOR PRODUCING A REINFORCEMENT STRUCTURE FOR A TIRE."

BACKGROUND

1. Field

The present disclosure falls within the field of tire manufacturing and relates more particularly to the manufacture of an improved carcass reinforcing ply structure for radial-carcass tires, namely a reinforcement the reinforcers of which are contained in radial planes containing the axis of rotation or form small angles with these radial planes.

2. Related Art

As is generally known, the structure of a radial tire comprises several zones each having a clearly defined role in the operation of a tire. A tire thus comprises two bead regions intended to collaborate with the seats of a mounting rim, these beads comprising a reinforcing structure in the circumferential direction, to which the carcass reinforcement is anchored. A crown reinforcement is arranged radially on the outside of the carcass reinforcement and hoops the latter when the tire is pressurized. A tread is arranged radially on the outside of the crown reinforcement and provides contact between the tire and the ground during running A tire sidewall extends between each bead and each axial end of the crown and provides the mechanical connection between the bead and the crown of the tire. Inside the tire, between the two beads, there is a layer impervious to the inflating gas and known by the name of "inner liner" because it covers the entirety of the internal wall of the tire.

In order to create such a structure, a tire is generally built by successively stacking several rubber plies on to a rotary tire building drum, these rubber plies each having specific properties, potentially being equipped with reinforcing elements, some plies also being connected to bead wires around which the beads are formed.

The first ply to be laid on the tire building drum is the inner liner because it forms the internal wall of the tire that is impervious to the inflating gas. Such an inner liner is described in document WO 2008/145277 in the name of the Applicant Companies and is formed from compounds based on butyl rubber which are known for their airtightness properties or based on polystyrene and polyisobutylene block copolymer thermoplastic elastomers. Although these operate satisfactorily, the inflation pressure of a tire equipped with such an airtight rubber must nevertheless be checked regularly, because gas leaks may nevertheless occur over time.

With a view to enhancing the airtightness of the tire, document EP 2205452 in the name of the Applicant Companies describes a tire comprising an airtight rubber casing and a reinforcing structure formed of fibres embedded in the rubber, the reinforcing structure being formed of a carcass layer and a crown layer and of means of connection between these layers. In this document, the fibres used to create the reinforcing structure each have a completely connected cross section, they are flattened in shape and have mutually orthogonal dimensions of preestablished dimensions and extend in a substantially radial direction on the tire. The reinforcing structure described in this document allows the airtightness of the tire to be enhanced and the mechanical fatigue thereof to be reduced.

Also known, from document EP 1397262 is a tire comprising an additional sidewall reinforcing reinforcement formed of strips of rubber reinforced by cords that are inclined with respect to the circumferential direction of the tire. The reinforcing rubber strips are applied by winding and partially overlapping one strip on another between the inner liner and the carcass ply when building the green tire. The role of this additional reinforcement is to give the sidewalls greater mechanical strength when the tire is subjected to high stress loadings during running.

While it exhibits good performance in terms of longevity, airtightness and strength, the tires described in these documents have a structure that is complex and their methods of manufacture involve numerous steps which prove tricky to perform and are time-consuming.

Also known, from documents EP 2781369 et U.S. Pat. No. 4,011,899 are composite reinforcing structures produced on the basis of strips embedded in an elastomeric material. Such composite structures admittedly have better mechanical strength, but the effect of this is to increase the weight of the tire.

SUMMARY

It is an object of the present disclosure to alleviate at least one of the disadvantages of the documents described herein and to propose a method of producing an improved reinforcing structure that allows a significant reduction in the mass of the tire without moreover reducing its performance.

To this end, the disclosure proposes a method of manufacturing a reinforcing structure for a tire in the form of a stratified assembly formed of two layers of reinforcing strips of completely connected cross section, and flattened in shape, wherein the strips of each layer are laid side by side in a main direction of laying, spacing the strips of the first layer apart by a distance that is less than the width of the strips of the second layer and in such a way that the edges of the strips of the first layer overlap the edges of the strips of the second layer, and wherein the two layers of strips are separated by a layer of uncoupling rubber.

According to an aspect of the disclosure, a stratified reinforcing assembly is created using an advantageous method of arranging the reinforcing strips in at least two layers separated from one another by a layer of uncoupling rubber, the reinforcing strips of the disclosure having both good mechanical properties and good impermeability to the inflation gas. By virtue of this method, a tire reinforcing structure is obtained that is arranged radially furthest towards the inside of the tire because it is able to remain airtight with respect to the inflation gas after the green tire has been shaped, while at the same time providing the mechanical strength of a carcass reinforcing ply of known type.

Such a reinforcing structure has the advantage of providing airtightness with respect to the inflation gas that is at least equivalent to the existing solutions while at the same time making it possible to substantially reduce the thickness and weight of the tire with respect to a conventional tire.

Indeed the reinforcing structure according to the disclosure exhibits flattened monofilament strips, each impermeable to the inflation gas, the various strips being arranged in a staggered configuration when "out flat" or during the phase of building the green tire on a building drum, and such that the edges thereof continue to overlap during the shaping of the tire. According to one important aspect of the disclosure, the layers of strips are separated by a layer of uncoupling rubber to which the strips of each layer adhere. The coefficient of elongation of the uncoupling rubber is greater than that of the strips, which means that, when the green tire is being shaped, the separation of the strips with respect to one another is controlled by the elongation of the uncoupling rubber that they follow. Thus, it has been found, during laboratory testing, that, in the absence of a layer of uncoupling rubber between the two layers of strips, during shaping, the strips slide over one another, leading to a configuration in which there are differences in pitch between the two layers of strips and, therefore, a risk of a lack of airtightness in the structure obtained. Now, tests performed with a layer of uncoupling rubber of predetermined thickness have shown that the separation between the strips remains constant because the strips follow the deformation of the uncoupling rubber and move with it. What is more, laying the strip on a layer of rubber makes manufacturing the reinforcing structure easier.

Such a reinforcing structure exhibits good airtightness properties and good mechanical strength and, as a result, on its own can replace several plies involved in the construction of a conventional tire. Thus, such a reinforcing structure replaces the inner liner and the carcass ply, and even also the sidewall reinforcing ply, when that is necessary.

For preference, the strips of the first and the second layer have the same width L and their edges overlap over at least 20% of the width L. This makes it possible to ensure good airtightness after shaping, even in zones of the tire in which the shaping is greatest, such as the shoulder zone.

Advantageously, the elastic modulus of the strips is greater than 500 MPa. This allows the reinforcing structure to provide the mechanical strength of the tire.

For preference, the said stratified assembly is arranged between and in contact with two layers of rubber. This allows better adhesion between the stratified assembly and the other layers of rubber involved in the structure of a tire.

For preference, the said reinforcing structure comprises, in this order: a layer of elastomer of a thickness comprised between 0.1 and 0.5 mm, a first layer of reinforcing strips having a thickness comprised between 0.05 and 0.35 mm, a layer of uncoupling rubber of a thickness comprised between 0.1 and 0.5 mm, a second layer of strips having a thickness comprised between 0.05 and 0.35 mm, and a layer of elastomer of a thickness comprised between 0.1 and 0.5 mm.

Advantageously, each strip has a width L and the strips forming a layer are arranged with a pitch p of less than 2L. The strips are arranged side by side with a pitch p greater than the width L of a strip but less than twice the width L of the strip.

For preference, the amount of overlap between the edges of the strips of the two layers is comprised between 0.2 and 0.5 times the pitch p.

Advantageously, the width of the strips is comprised between 1 and 12 mm, preferably between 3 and 7 mm.

For preference, the said strips are made of a single material.

For preference also, the said material is selected from PET, PEN, aluminium, steel, or polyamides.

In a first embodiment of the disclosure, the said reinforcing structure is produced by calendering.

In a second embodiment of the disclosure, the said reinforcing structure is produced by winding successive layers onto a rotary shell ring.

The object of the disclosure is also achieved with a tire reinforcing structure obtained using the method of the disclosure.

The object of the disclosure is also achieved with a tire with no airtight inner liner, comprising a reinforcing structure obtained using the method of the disclosure.

BRIEF DESCRIPTION OF THE DRAWINGS

Further features and advantages of the disclosure will become apparent from the following description. This description, which is given by way of non-limiting example, refers to the appended drawings, in which.

DETAILED DESCRIPTION OF THE ENABLING EMBODIMENT

In the various figures, identical or similar elements bear the same references. Their description is therefore not systematically repeated.

Figure 1:
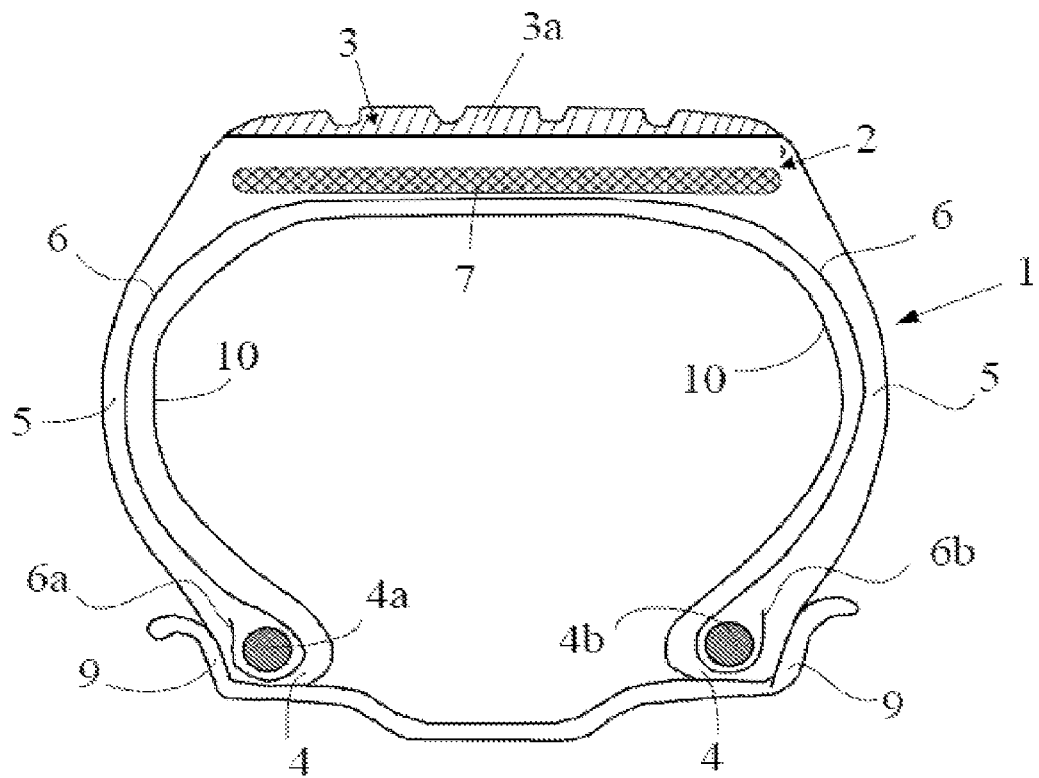
FIG. 1 is a view in radial section of a tire of known type.

In FIG. 1, a diagrammatically depicted tire 1 comprises a crown 2 comprising a tread 3, the radially outer part 3a of which is intended to come into contact with the road, two inextensible beads 4 in which a carcass reinforcement 6 is anchored. The crown 2, connected to the beads 4 by two sidewalls 5, is, in a way known per se, reinforced by a crown reinforcement or "belt" 7 which is at least partly metallic and which is radially outer with respect to the carcass reinforcement 6. A tire belt is generally composed of at least two superimposed belt plies, sometimes referred to as "working" plies or "crossed" plies, the reinforcing elements or "reinforcers" of which are positioned virtually parallel to one another inside a ply, but crossed from one ply to the other, that is to say inclined, symmetrically or asymmetrically, with respect to the median circumferential plane, by an angle which is generally between 10° and 45°, according to the type of tire under consideration. Each of these two crossed plies is composed of a rubber matrix or "calendering rubber" which coats the reinforcers. In the belt, the crossed plies can be supplemented by various other auxiliary rubber plies or layers, with widths which can vary as the case may be, comprising or not comprising reinforcers; mention will be made, by way of example, of simple rubber cushions, "protection" plies having the role of protecting the remainder of the belt from external attacks or perforations, or else "hooping" plies comprising reinforcers oriented substantially along the circumferential direction ("zero-degree" plies), whether radially outer or inner with respect to the crossed plies.

For the reinforcing of the above belts, in particular of their crossed plies, protection plies or hooping plies, use is generally made of reinforcers in the form of steel cords or textile cords composed of thin threads assembled together by braiding or twisting.

The carcass reinforcement 6 is here anchored in each bead 4 by winding around two bead wires 4a, 4b, the turn-up 6a, 6b of this reinforcement 6 being, for example, positioned towards the ouFcharacttside of the tire 1, which is here depicted mounted on its rim 9. The carcass reinforcement 6 is made up of a ply reinforced by radial textile cords, that is to say that these cords are positioned practically parallel to one another and extend from one bead to the other so as to form an angle of between 80° and 90° with the median circumferential plane (plane perpendicular to the axis of rotation of the tire which is located mid-way between the two beads 4 and passes through the middle of the crown reinforcement 7). Of course, this tire 1 additionally comprises, in a known way, a layer 10 of inner rubber or elastomer (commonly known as "inner liner") which defines the radially inner face of the tire and which is intended to protect the carcass ply from the diffusion of air originating from the space interior to the tire.

The sidewalls 5 are sometimes reinforced with additional reinforcing plies in order to react to high mechanical stress loadings. These additional reinforcing plies generally comprise reinforcing elements or "reinforcers" arranged parallel to one another in a rubber matrix and arranged radially on the inside or the outside with respect to the carcass reinforcement.

In a carcass reinforcement of known type, a reinforcer takes the form of a thread of a cord comprising a collection of twisted or braided threads. The thread or threads constituting the reinforcer may be metallic, polymeric, natural or composite in nature.

Figure 2:
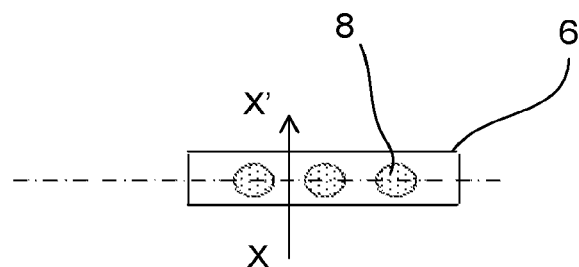
FIG. 2 is a schematic depiction in cross section of a carcass reinforcement of known type.

FIG. 2 illustrates the reinforcers 8 visible in a cross section of the carcass reinforcement 6. The reinforcers 8 of a carcass reinforcement 6 are spaced apart and are embedded in a rubber matrix. X-X' indicates the path taken by the inflation gas to pass through the carcass reinforcement 6.

As FIGS. 3 to 7 illustrate, the disclosure relates to the manufacture of a reinforcing structure 20 which uses an advantageous arrangement of strips 22 arranged in superposed layers in order to form a stratified assembly. The strips 22 of the disclosure have completely connected cross sections and are flattened in shape. What is meant by a strip that is flattened in shape is a narrow strip, the width of which is greater than the height or thickness. It will be recalled that a completely connected surface is a surface any two parts of which have to be joined together.

What is meant by a stratified assembly is any product comprising at least two layers of planar or non-planar shape, which are in contact with one another, it being possible for these either to be connected or not to be connected, in which "connected" is understood to encompass any means of assembly, particularly bonding.

What is meant by rubber or elastomer is preferably any type of diene or non-diene elastomer, for example thermoplastic elastomer, or a blend of elastomers: natural rubber and synthetic rubber, reinforcing fillers: carbon black and silica, plasticizers: oils, resins and other chemical elements such as sulfur for example.

A layer means a strip having a thickness that is very small relative to its other dimensions, for which the ratio of the thickness to the largest of its other dimensions is less than 0.5, preferably less than 0.1.

More particularly according to the disclosure, the reinforcing structure is produced in the form of a stratified assembly formed of two layers of strips spaced apart, overlapping and comprising an uncoupling rubber arranged between and in contact with two layers of strips.

These strips are made from a film stretched mono- or multi-axially and having a tensile modulus E greater than 500 MPa. This film is preferably made from a thermoplastic polymer which is preferably a polyester, more preferably a PET (polyethylene terephthalate) or a PEN (polyethylene naphthalate). The film may also be made from a polyamide. The strips of the two layers may be made from one and the same material or from different materials.

For preference, a heat treatment is also applied to the strip, so as to limit its thermal contraction as the temperature of the whole rises. Such a heat treatment is, for example, an annealing, a tempering or a combination of several of these treatments.

In an alternative form, the film may be metallic, for example made of aluminium or of steel.

In another alternative form, composite material comprising a matrix of PET, PEN, PA or epoxy resin and reinforced with glass or carbon fibres or synthetic fibres such as nylon, or aramid, etc. fibres.

The material of the strip is chosen so that it exhibits good impermeability to the inflation gas. By way of example, the strips need to have a nitrogen permeability of between 0.001 and 10 $cm^3$ $mm/m^2/day/atm$ and preferably of between 0.1 et 1 $cm^3$ $mm/m^2/day/atm$.

Figure 3:
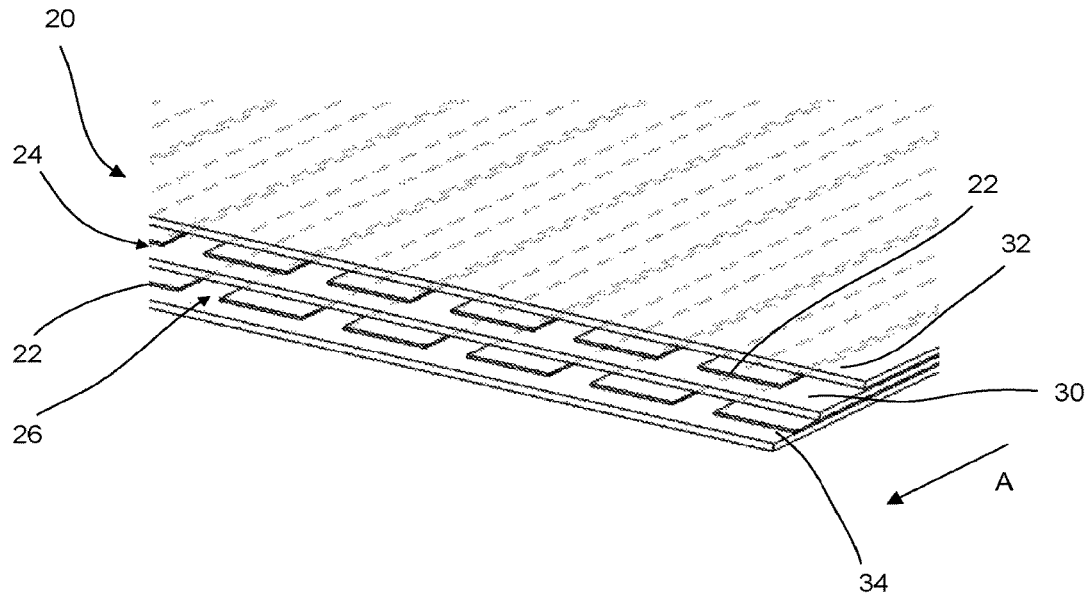
FIG. 3 is a schematic depiction in perspective of a reinforcing structure according to the disclosure.

FIG. 3 illustrates, in a perspective view, a reinforcing structure 20 according to the disclosure, which comprises: a first layer 24 of strips 22 arranged side by side, spaced apart, a second layer 26 of strips 22 arranged side by side, spaced apart and parallel to the strips of the first layer and to the direction of laying A. The strips of the first layer 24 are offset in relation to the strips of the second layer in a direction perpendicular to the direction of laying A. The two layers of strips are separated by a layer of uncoupling rubber 30. The reinforcing structure is supplemented by two layers of rubber, an external layer 32 and an internal layer 34.

Figure 4:
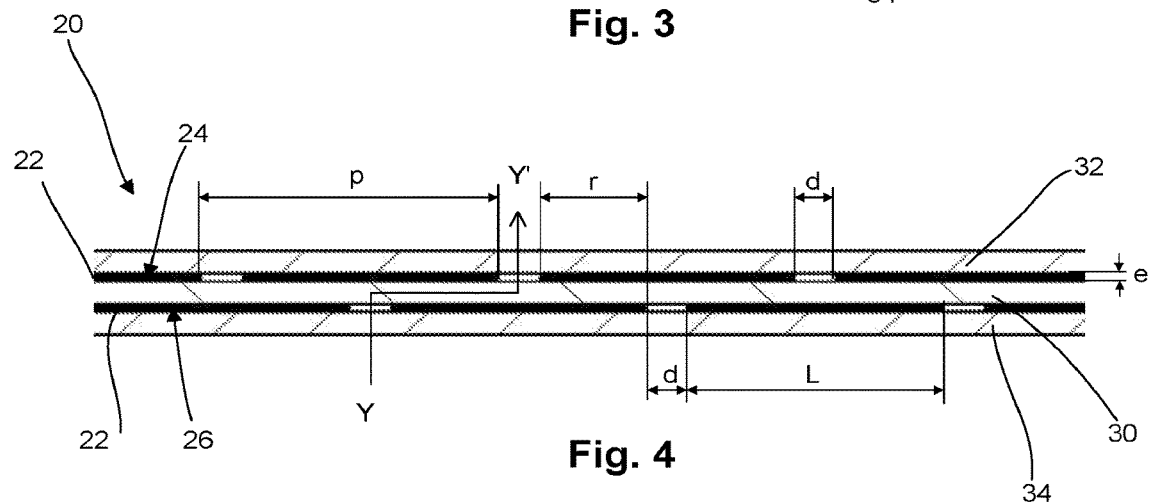
FIG. 4 is a schematic depiction in cross section of a reinforcing structure according to the disclosure prior to the shaping of the green tire.
Figure 5:
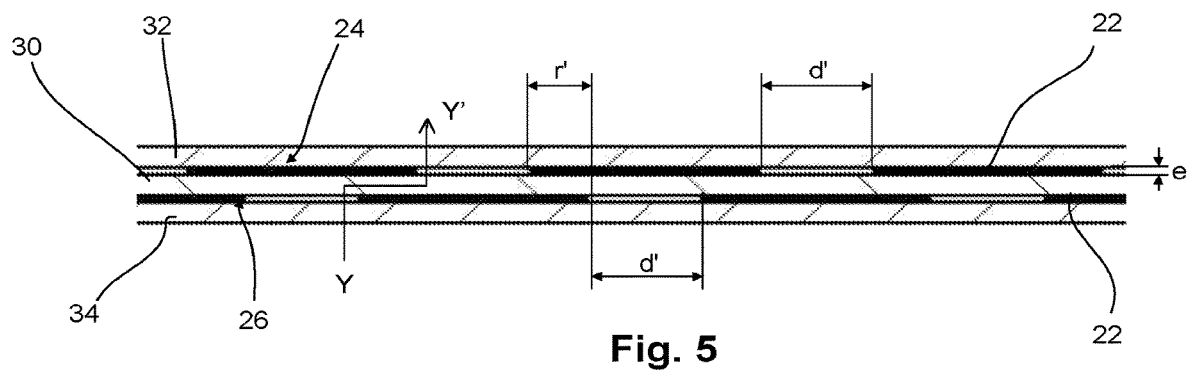
FIG. 5 is a schematic depiction in cross section of a reinforcing structure according to the disclosure after the shaping of the green tire.

FIG. 4 illustrates, in a schematic view in section on a plane transverse to the direction of laying A, a reinforcing structure prior to the shaping of the green tire or during laying while laid out flat, and FIG. 5 illustrates the same view taken after the green tire has been shaped. It will be recalled that shaping means an operation during which a green tire makes the transition from a cylindrical overall shape to a toroidal overall shape.

In the example illustrated in the figures, use is made of identical strips having a width "L" and a thickness "e" and a first layer 24 of strips is created by arranging several strips parallel to one another, spaced apart by a distance "d" with a pitch "p". The second layer 26 of strips is created in the same way, but offsetting the strips 22 in such a way that their edges overlap with the strips of the first layer 24 by an overlap distance "r". It will be noted in FIG. 5 that the spacing between the strips after shaping has become "d'", with d'>d, and the overlap "r'" with r'<r.

After laboratory testing, it has been found that it is advantageous to use strips 22 having a width L of between 1 and 12 mm and preferably of between 3 and 7 mm, and to lay them at a pitch p less than twice the width L in order to create a first layer 24 of strips. The second layer 26 of strips is preferably created with identical strips, laid at the same pitch but offsetting them by a distance of between 0.2 and 0.5 of the value of the pitch p with respect to the strips of the first layer 24. In this way, a stratified assembly is obtained in which the edges of the strips of the two layers overlap prior to shaping (FIG. 4). The value of the overlap is chosen so that the strips of the two layers also overlap after shaping, where FIG. 5 illustrates a cross section in the shoulder region of the green tire. The reinforcing structure of the bead zone is modified only a little during shaping and the offset of the strips of the two layers is practically that of FIG. 4 even after shaping. Y-Y' in FIGS. 4 and 5 indicates the path that the inflation gas has to take in order to succeed in passing through the reinforcing structure 20. It may thus be seen that the path Y-Y' is longer than the path X-X' of FIG. 2 in which the inflation gas passes through the carcass reinforcement in a direction perpendicular thereto. In the reinforcing structure 20 of the disclosure, the path of the gas is diverted by the strip 22 (the direction of stretch of the strip is advantageously chosen to be perpendicular to the movement of the inflation gas), forcing the inflation gas to cover an additional length of path and making it possible to reduce the losses of inflation gas via the reinforcing structure 20.

One important parameter is also the thickness of the strips, this thickness needs to be thin and well-controlled and is comprised between 0.05 and 0.35 mm and preferably between 0.05 and 0.15 mm.

Another important parameter in the creation of the stratified assembly of the disclosure is the thickness of the layer of uncoupling rubber 30 and the adhesion thereof to the reinforcing strips 22. Thus, the layer of uncoupling rubber needs to have a well-controlled thickness so as to guarantee the uniformity of its deformation across the entire surface of the stratified assembly. The thickness of the layer of uncoupling rubber has a value comprised between 0.1 and 0.5 mm with a tolerance of +1-5% of the value of the thickness of this layer.

As far as the adhesion between the uncoupling rubber 30 and the strips 22 is concerned, this needs to be perfect in order to be able to ensure the controlled movement of the reinforcer during the shaping of the green tire. There are a number of proposed solutions for guaranteeing this adhesion. One of the solutions is to create the stratified assembly in the hot state. Another solution for causing the uncoupling rubber to adhere to the strip is to use a suitable adhesive. For example, a textile adhesive of the "RFL" (resorcinol-formaldehyde-latex) type is recommended for achieving adhesion between a strip made of a thermoplastic polymer and the layer of rubber. Any other suitable adhesive known for conferring satisfactory adhesion between the rubber and the strips may thus be used.

The strips of the stratified assembly are laid in a direction of laying to each constitute a layer of strips, the two layers extending in two parallel planes separated from one another by a layer of uncoupling rubber. The direction of laying of the strips is longitudinal or circumferential depending on the method of manufacture of the stratified assembly, as will be explained later on. When building the green tire, the stratified assembly is laid on the drum in such a way that the main direction or direction of laying of the strips is substantially axial (which means to say parallel to the axis of symmetry of the green tire or to the axis of rotation of the drum).

Figure 6:
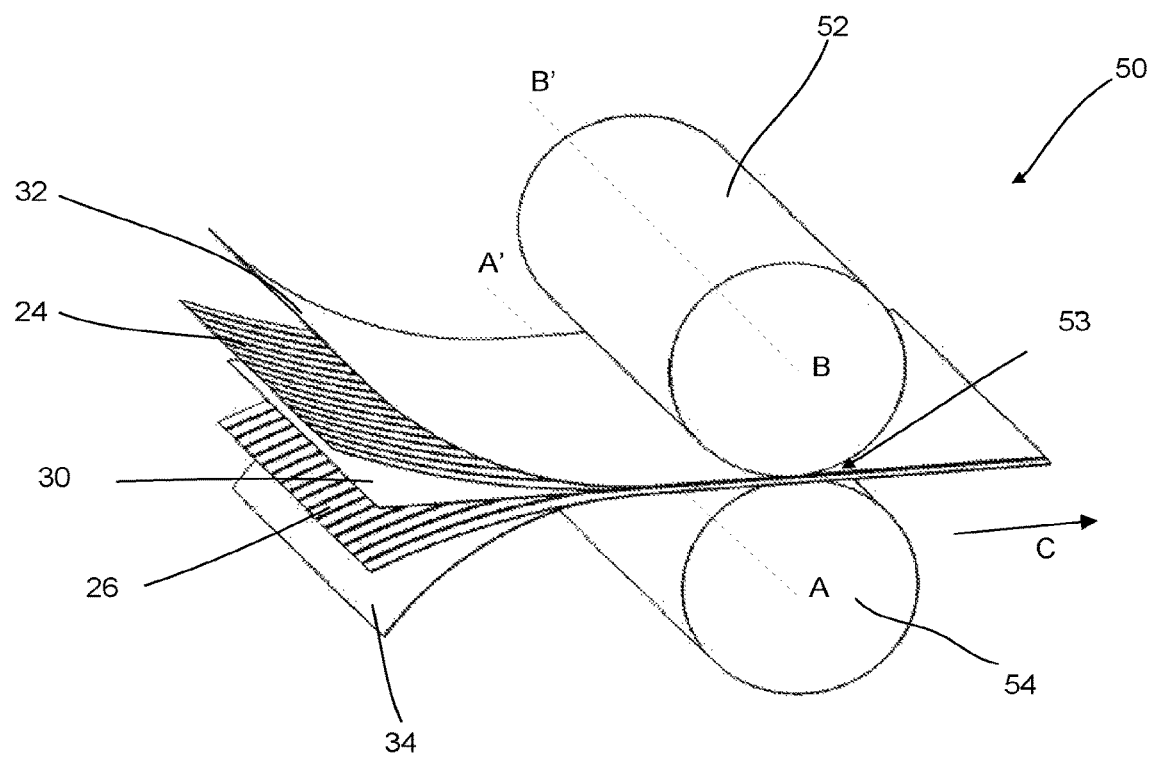
FIG. 6 is a schematic depiction of a device for manufacturing a reinforcing structure according to a first embodiment of the disclosure.

In order to implement the method, the disclosure proposes, according to a first embodiment, a skimming device 50 as illustrated in FIG. 6 and comprising two calendering rolls 52, 54, the respective axes AA' and BB' of which are substantially parallel to one another. The space between the two rolls defines a gap 53 through which there pass: the external layer 32 of rubber, the first layer 24 of strips 22, the layer 30 of uncoupling rubber, the second layer 26 of strips 22 and the internal layer 34 of rubber. The layers of strips and the uncoupling rubber separating them are sandwiched between the two layers of rubber and the pressure applied by the rolls 52, 54 forces the rubber to penetrate the spaces between the strips, making it possible to improve the adhesion of the whole. The calendering device is supplied with layers of rubber from rubber spools (not depicted), and the strips are paid out from strip spools, the strips of each layer being guided as they pass through a grooved roll with U-shaped grooves situated upstream of the calendering rolls. Such strip-guiding rolls (not depicted) are of the type known in the calendering of reinforcing plies. Advantageously, the external layers 32 and internal layers 34 may be supplied by two additional rolls with axes parallel to those of the rolls 52, 54 which collaborate with the latter so as to allow the external 32 and internal 34 layers to be created simultaneously during manufacture in the gaps that they form with the rolls 52, 54. This method thus allows hot calendering of the assembly that forms the reinforcing structure in order to achieve better adhesion of the various layers.

The stratified assembly thus obtained passes at high speed in the direction of conveying C which is parallel to the main direction of laying of the strips. In order to obtain a reinforcing structure 20 used in the building of a green tire, a length of the assembled ply derived from the calendering operation is cut to a dimension approximately corresponding to the dimension of the distance between bead wires of the green tire that is to be built. The segment thus cut is then laid on a tire building drum and constitutes the first layer of the assembly thus forming an airtight carcass reinforcing structure.

Figure 7:
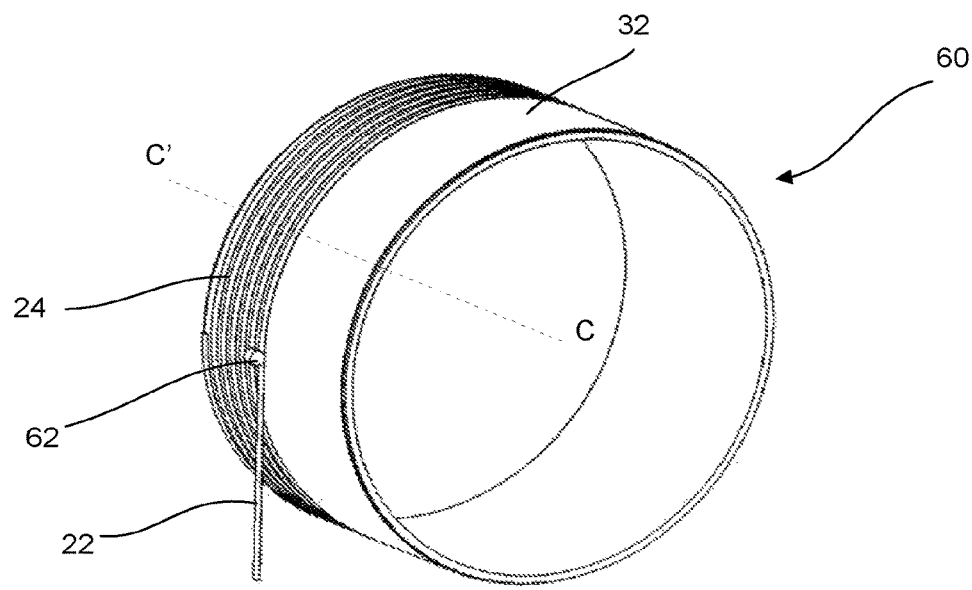
FIG. 7 is a schematic depiction of a device for manufacturing a reinforcing structure according to a second embodiment of the disclosure.

FIG. 7 illustrates a device making it possible to implement the method according to a second embodiment of the disclosure. This device comprises a shell ring on which the various layers involved in the composition of the reinforcing structure 20 are laid by successive winding operations. FIG. 7 shows a shell ring 60 of cylindrical shape with a circular cross section and longitudinal axis CC'. The shell ring 60 comprises means of driving it in rotation about its longitudinal axis CC'. A layer of rubber that forms the external layer 32 has been laid on the shell ring on top of which layer strips 22 of thickness e and pitch separation p have been laid by helical winding, which strips are pressed down during laying using a roller 62 so as to ensure adhesion between the strip and the layer of rubber already laid. The main direction of laying of the strips 22 in this case is the circumferential direction of the shell ring 60.

Having completed the winding of the strips onto the shell ring and having thus formed the first layer 24 of strips, this layer is then covered with a layer 30 of uncoupling rubber. The strips 20 are then applied to the layer of uncoupling rubber, offsetting them by a distance d with respect to those of the first layer 24 so as to obtain, again by helical winding, the second layer 26 of strips. This second layer 26 is then covered with a layer of rubber 34. This then yields a reinforcing structure in the form of a stratified assembly that can be used in the building of a tire. In order to be able to be used as a carcass reinforcing structure for a radial tire, this wound stratified assembly needs to be cut radially to a length corresponding approximately to the distance between bead wires of the green tire that is to be built. It is advantageously a shell ring 60 of large diameter that is chosen, so as to obtain a stratified assembly of near-planar shape. The segment thus cut is then laid on a rotary tire building drum such that the direction of laying of the strips is substantially parallel to the axis of rotation of the drum and constitutes the first layer of the green tire thus forming an airtight carcass reinforcing structure.

In an alternative form not illustrated in the figures, a strip 22 of width is coated with rubber and laid on a tire building drum. In order to do this, the dimensions (width and thickness) of the coating of rubber around a strip 22 of width L and of thickness e are calculated so as to obtain a reinforcing structure according to the disclosure without laying an additional layer of rubber.

Other alternative forms and embodiments of the disclosure may be envisaged without departing from the scope of these claims. Thus, a structure having three or more layers of strips separated from one another by an uncoupling rubber may also be envisaged.

What is claimed is:

1. A method of manufacturing a tire, comprising the steps of:
    forming a reinforcing structure by laying a plurality of strips of a first layer and a plurality of strips of a second layer side by side in a main direction of laying, spacing the strips of the first layer apart by a distance that is less than a width L of the strips of the second layer and in such a way that edges of the strips of the first layer overlap edges of the strips of the second layer, and wherein the first layer of strips is separated by the second layer of strips by a layer of uncoupling rubber, the reinforcing structure further including an external layer of rubber and an internal layer of rubber, and wherein the layer of uncoupling rubber and the external layer of rubber and the internal layer of rubber are all of materials that are pervious to air; and
    building the tire with the reinforcing structure and without an innermost rubber layer that has airtightness properties.

2. The method of manufacturing a tire according to claim 1, wherein the strips of the first and the second layer have identical widths L and their edges overlap over at least 20% of the width L.

3. The method of manufacturing a tire according to claim 1, wherein an elastic modulus of the strips of both the first layer and the second layer is greater than 500 MPa.

4. The method of manufacturing a tire according to claim 1 further including the step of forming the reinforcing structure with, in this order: the external layer of rubber of a thickness comprised between 0.1 and 0.5 mm, the first layer of reinforcing strips having a thickness comprised between 0.05 and 0.35 mm, the layer of uncoupling rubber of a thickness comprised between 0.1 and 0.5 mm, the second layer of strips having a thickness comprised between 0.05 and 0.35 mm, and the internal layer of rubber of a thickness comprised between 0.1 and 0.5 mm.

5. The method of manufacturing a tire according to claim 1, wherein each strip of the first layer of strips and of the second layer of strips has a width L and the strips forming each of the first and second layers of strips are arranged with a pitch p of less than 2L.

6. The method of manufacturing a tire according to claim 5, wherein an amount of overlap between the edges of the strips of the first layer of strips with the edges of the strips of the second layer of strips is comprised between 0.2 and 0.5 times the pitch p.

7. The method of manufacturing a tire according to claim 1, wherein the width L of the strips of the first layer and also widths of the strips of the second layer are comprised between 1 and 12 mm.

8. The method of manufacturing a tire according to claim 1 wherein the strips of each of the first and second layers of strips are made of a single material.

9. The method of manufacturing a tire according to claim 8, wherein the single material is selected from the group consisting of PET, PEN, aluminium, steel, and polyamide.

10. The method of manufacturing a tire according to claim 1, further including the step of producing the reinforcing structure by calendering.

11. The method of manufacturing a tire according to claim 1, wherein the step of forming the reinforcing structure includes winding successive layers onto a rotary shell ring.

12. The method of claim 1 wherein the strips of each of the first and second layers of strips are made of a material that has a nitrogen permeability of between 0.001 and 10 $cm^3 \cdot m^2/day/atm$.

13. The method of manufacturing a tire of claim 1 further comprising the step of laying the reinforcing structure on a rotary tire building drum such that a direction of laying of the strips of each of the first and second layers of strips is substantially parallel to an axis of rotation of the drum and constitutes a first layer of a green tire thus forming an air tight carcass reinforcing structure.

* * * * *